Figure 1:
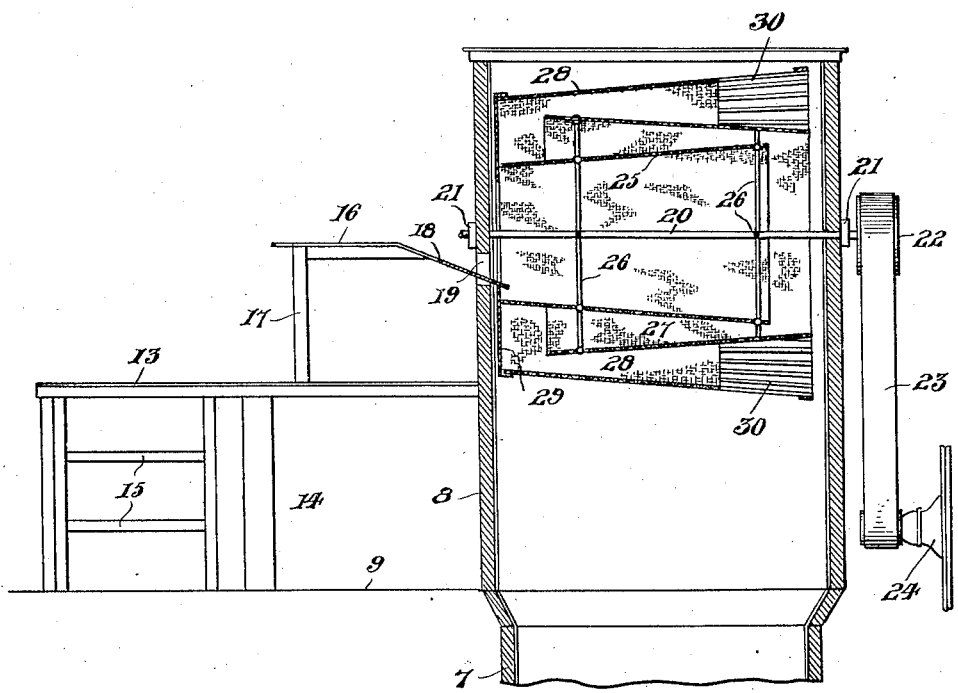

L. T. FREDERICK.
MICA BUILDING MACHINE.
APPLICATION FILED NOV. 5, 1919.

1,359,685.

Patented Nov. 23, 1920.
2 SHEETS—SHEET 1.

Inventor
L. T. Frederick

By F. E. Shannon, Attorney

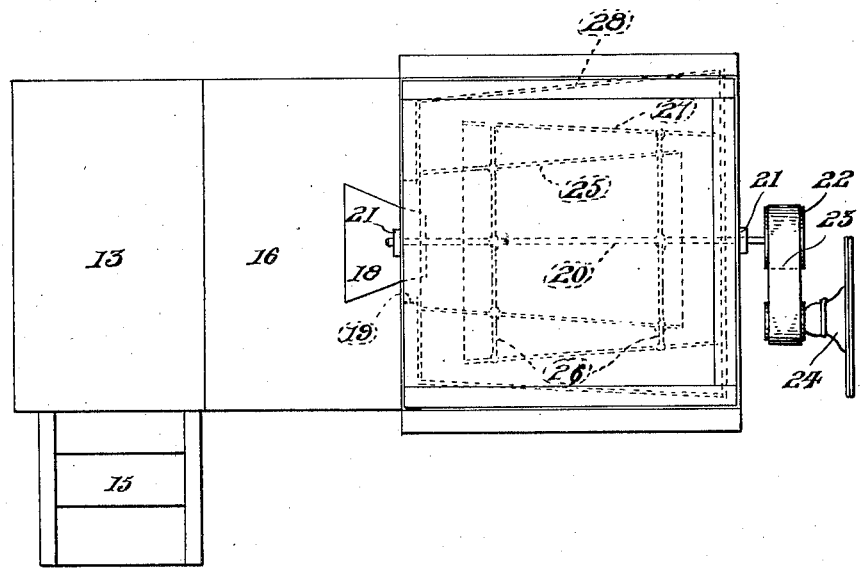
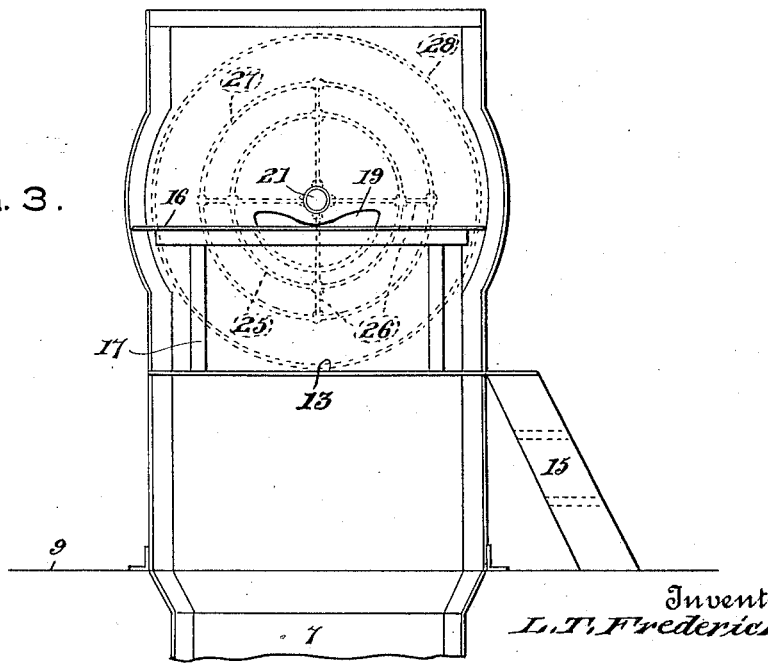

UNITED STATES PATENT OFFICE.

LOUIS T. FREDERICK, OF VALPARAISO, INDIANA.

MICA-BUILDING MACHINE.

1,359,685.  Specification of Letters Patent.  Patented Nov. 23, 1920.

Application filed November 5, 1919. Serial No. 335,879.

*To all whom it may concern:*

Be it known that I, LOUIS T. FREDERICK, a citizen of the United States, residing at Valparaiso, in the county of Porter and State of Indiana, have invented new and useful Improvements in Mica-Building Machines, of which the following is a specification.

The primary object of the present invention resides in the provision of a machine employed in the manufacture of mica plate wherein the mica in flake form is fed into the upper end of a tower to fall to the bottom thereof and by the law of average as with falling snow, seek a true level on a building plate.

A further object of the invention resides in the provision of a mica building machine wherein a plurality of coöperating screening devices are arranged at the upper end of a tower to cause a disintegration of the mica flakes fed thereinto to insure a complete separation of the flakes before leaving the screening elements to be received upon building plates at the lower end of the tower.

This invention embodies in its entirety the main structure of details set forth in my copending application filed September 18, 1919, Serial No. 324,331, the present invention differing from the previous application in that a complete disintegration or separation of the mica flakes is accomplished by mechanically operating screens in the absence of pneumatic or battering devices such as air blast and fan elements.

With the above and other objects in view, this invention consists in the novel form, combination and arrangement of parts herein fully described and shown in the accompanying drawings wherein like reference characters designate similar parts throughout the several views.

In the drawings,

Figure 1 is a vertical sectional view of the upper end of a mica building tower constructed in accordance with the present invention, the sifting screens therein being shown in section, Fig. 2 is a top plan view thereof showing the platform and receiving chute for the tower, and, Fig. 3 is a side elevational view of the form shown in Fig. 1.

In the art to which this invention pertains, it is customary to project blasts of air against an incoming stream of mica flakes to cause a separation of the flakes previous to their reception upon a building plate located at the bottom of the tower, and in some instances in addition to the blast devices, cross bars have been positioned transversely of a tower for contacting the falling mica flakes. The present invention aims to provide a material advance in the art in that a mechanical disintegrator for the mica flakes is provided and one which is capable of operation to the exclusion of air blast devices, the mechanical disintegrator including a plurality of truncated cone-shaped screens arranged in surrounding formation with the mesh of the screens increasing in size from the innermost one to the outer screen and with the screens being rotatably mounted in the upper end of the tower and inclined in a manner to cause the mica flakes fed into the innermost screen to be delivered from the end thereof into the next rotatable screen and subsequently delivered from the end thereof to the outermost screen for percolation therethrough and into the tower. The finer flakes of the mica will fall through the screen meshes and seek an immediate level upon the building plates at the lower end of the tower while the larger flakes will be fed from the ends of the screens to the adjacent one and subsequently to the tower.

Describing the invention more in detail, it being noted that the upper end of the tower alone is shown, the tower is designated by the reference numeral 7 as having an enlarged section 8 at its upper end positioned above the upper floor line 9 while an inspection of the interior of the tower may be had at suitable points spaced below the floor line. An operator's platform 13 supported by legs 14 is mounted by means of the steps 15. A superplatform 16 is supported upon the platform 13 by legs 17 and includes a forward inclined plate 18 extending into the tower section 8 through the opening 19 in the side thereof.

A shaft 20 is horizontally journaled transversely of the tower section 8 at a point above the opening 19 in bearings 21, the shaft 20 carrying a pulley 22 upon the rear projecting end thereof as shown more clearly in Figs. 1 and 2 as having a belt connection 23 with a motor 24. The screens for separating and disintegrating the mica flakes fed into the tower are supported on the shaft 20 and gradually increase in coarseness of mesh from the inner screen to the outer one, while any number of screens may be employed, but three are illustrated, the inner screen 25 having spokes 26 for supporting the same upon the shaft 20 and being of open-ended truncated form, the smaller end of the screen 25 being positioned adjacent the inlet opening 19 and having the inclined feed plate 18 of the superplatform 16 projecting thereinto. The intermediate screen 27 is supported by the spokes 26 passing through the screen 25 and is of the same design as the inner screen 25 with the larger and smaller ends thereof reversed so that mica flakes delivered from the inner screen 25 to the intermediate screen 27 will be delivered into the outer screen 28 at a point adjacent the smaller end of the screen 25, the outer screen 28 being supported by the plate 29 connecting the smaller end of the screen 25. The design of the screen 28 slightly varies from the screens 25 and 27 in that the larger end of the same is free of wire mesh and includes a slatted structure as at 30.

In the operation of the device, the desired quantity of mica flakes is fed from the superplatform 16 onto the inclined plate 18 extending into the innermost screen 25 for delivery thereinto. The motor 24 rotating the shaft 20 causes a revolving movement of the screens and the finer mica flakes will percolate or sift through the screen 25 and subsequently through the screens 27 and 28 for delivery into the tower 7 whereupon the liberated flakes will descend to the bottom of the tower for reception upon a building plate and for even distribution thereon, it being understood that the tower is substantially air tight and free of extraneous disturbances so that the falling mica flakes will be undisturbed. The larger flakes are fed forwardly through the rotatable screen 25 for delivery from the end thereof into the smaller end of the screen 27 and inclination of this screen being reversed to that of the inner screen, the mica flakes will be reversely fed and delivered from the larger end of the screen 27 into the outermost screens 28, it being noted, however, that a number of flakes will sift through the screens 27 and 28. The screens 25 and 28 extending in like directions and in opposition to screen 27, the mica flakes will be fed toward the larger end thereof and in a direction to be received on the slats 30 at which point a severe jolting action will result positively to cause a disintegration of any cohering flakes. The speed of the motor controls the speed of rotation of the screens and with a variance of speed rotation, the screens can be properly regulated to insure a thorough and complete disintegration of the mica flakes.

While there is herein shown and described the preferred embodiment of the invention, it is nevertheless to be understood that minor changes may be made without departing from the spirit and scope of the invention as claimed.

What I claim as new is:—

1. In a machine of the type described, the combination with a tower, of means for feeding flake material to the upper end thereof, means adapted to receive flake material prior to its free discharge into the tower to cause a disintegration of the flakes, said last named means including a plurality of concentrically arranged screens, with the ends of the screens being in staggered relation and of frusto-conical form whereby material fed to the inner screen will travel therefrom to the outermost screen and being delivered at points spaced from the ends of the adjacent outer screen with the delivery ends of the inner screens spaced therefrom.

2. In a machine of the type described, the combination with a tower, of means for feeding flake material to the upper end thereof, means adapted to receive flake material prior to its free discharge into the tower to cause a disintegration of the flakes, said last named means including a plurality of concentric screens with the mesh thereof increasing in size toward the outer screen with a portion of the outer screen being of slatted construction and with the discharge ends of the inner screens terminating inwardly of the enlarged receiving end of the outer adjacent screen and spaced therefrom.

In testimony whereof I have hereunto set my hand.

LOUIS T. FREDERICK.